US012744344B2

(12) United States Patent
Hofmann et al.

(10) Patent No.: US 12,744,344 B2
(45) Date of Patent: Sep. 22, 2026

(54) ELECTRICAL PLUG CONNECTOR WITH RADIALLY ACTUATED SECONDARY LOCKING, AND ELECTRICAL PLUG-IN CONNECTION SYSTEM

(71) Applicant: MD Elektronik GmbH, Waldkraiburg (DE)

(72) Inventors: Thomas Hofmann, Tacherting (DE); Daniel Bock, Schönberg (DE)

(73) Assignee: MD Elektronik GmbH, Waldkraiburg (DE)

( * ) Notice: Subject to any disclaimer, the term of this patent is extended or adjusted under 35 U.S.C. 154(b) by 301 days.

(21) Appl. No.: 18/405,317

(22) Filed: Jan. 5, 2024

(65) Prior Publication Data

US 2024/0250465 A1 Jul. 25, 2024

(30) Foreign Application Priority Data

Jan. 24, 2023 (DE) ..................... 10 2023 101 706.3

(51) Int. Cl.
*H01R 13/436* (2006.01)

(52) U.S. Cl.
CPC ................................ *H01R 13/4365* (2013.01)

(58) Field of Classification Search
CPC ............ H01R 13/4365; H01R 2101/00; H01R 2201/26; H01R 13/4223; H01R 13/4362; H01R 13/639; H01R 13/187; H01R 13/2414; H01R 13/508; H01R 13/5221; H01R 13/62927; H01R 13/6273; H01R 24/38
See application file for complete search history.

(56) References Cited

U.S. PATENT DOCUMENTS

| | | | | |
|---|---|---|---|---|
| 5,389,014 | A | 2/1995 | Kuempel et al. | |
| 5,851,128 | A | 12/1998 | Nakata et al. | |
| 7,234,877 | B2 * | 6/2007 | Sedor | G02B 6/3879 385/59 |
| 9,684,130 | B2 * | 6/2017 | Veatch | G02B 6/2726 |
| 10,797,427 | B2 | 10/2020 | Dupont et al. | |
| 2020/0112125 | A1 | 4/2020 | Liptak et al. | |
| 2020/0153144 | A1 | 5/2020 | Raydiall | |
| 2021/0234304 | A1 | 7/2021 | Zebhauser | |
| 2022/0384983 | A1 * | 12/2022 | Iwamoto | H01R 13/4362 |

FOREIGN PATENT DOCUMENTS

| | | | |
|---|---|---|---|
| DE | 69314724 | T2 | 3/1998 |
| DE | 102018113365 | A1 | 12/2019 |
| EP | 3713018 | A1 | 9/2020 |

* cited by examiner

*Primary Examiner* — Seung H Lee
(74) *Attorney, Agent, or Firm* — Maier & Maier, PLLC

(57) ABSTRACT

An electrical plug connector includes: a plug contact at one end of a cable, a contact carrier, a plug housing, a primary locking element, and a secondary locking element. The plug contact is accommodated in the contact carrier and the latter is accommodated in the plug housing. The primary locking element and the secondary locking element are each configured to secure the plug contact in the contact carrier against removal from the contact carrier by pulling in an axial direction parallel to a longitudinal direction of the cable. The secondary locking element is configured as a separate component that is displaceable relative to the contact carrier.

13 Claims, 13 Drawing Sheets

ELECTRICAL PLUG CONNECTOR WITH RADIALLY ACTUATED SECONDARY LOCKING, AND ELECTRICAL PLUG-IN CONNECTION SYSTEM

FIELD

The present invention relates to an electrical plug connector. The invention further relates to a corresponding plug-in connection system.

BACKGROUND

An electrical plug-in connection system, such as that used to make electrical connections in a motor vehicle, may comprise a first plug connector and a second plug connector acting as a mating plug connector, each with a primary locking function and a secondary locking function, which ensure that respective plug contacts at the ends of cables to be connected to one another are held securely in the respective plug connector and, in particular, may withstand tensile stress. The locking functions may also be configured such that the plug connector and the mating plug connector may only be fully mated if the plug contacts have been correctly positioned in the plug connector and the mating plug connector. Components for implementing the secondary locking function may vary greatly depending on the housing design of the plug connector and mating plug connector.

EP 3 713 018 A1 describes a plug connector with a secondary securing means which, in an initial position, is located in an insertion path of the mating plug connector, the secondary securing means being displaceable towards a rear end of a plug connector housing into a securing position such that, in the securing position, the secondary securing means clears the insertion path for the mating plug connector.

SUMMARY

There may be a need for an alternative and/or improved electrical plug connector with a secondary locking function. In particular, there may be a need for a plug connector in which the secondary locking function is implemented in a way that is easy to realize, with few components and/or in a way that is easy to actuate. There may also be a need for a corresponding plug-in connection system.

Such a need may be met by the subject matter of one of the independent claims. Advantageous embodiments are presented in the dependent claims, the following description and the attached Figures.

A first aspect of the invention relates to an electrical plug connector comprising a plug contact at one end of a cable, a contact carrier, a plug housing, a primary locking element, and a secondary locking element. The plug contact is accommodated in the contact carrier. The contact carrier is accommodated in the plug housing. Both the primary locking element and the secondary locking element are each configured to secure the plug contact in the contact carrier against removal from the contact carrier by pulling in a direction parallel to a longitudinal direction of the cable. The secondary locking element is configured as a separate component displaceable relative to the contact carrier. The secondary locking element, the contact carrier and the plug contact are configured such that the secondary locking element may be brought from a pre-fixed intermediate position to a fixed end position by displacement in a radially inward direction relative to the contact carrier. The secondary locking element is reversibly detachably held on the contact carrier in the pre-fixed intermediate position. Furthermore, in the fixed end position, the secondary locking element is held securely on the contact carrier and bears, at least in areas, on the plug contact, such that the plug contact is secured in the contact carrier by the secondary locking element against the removal from the contact carrier by pulling in a direction parallel to a longitudinal direction of the cable.

A second aspect of the invention relates to a plug-in connection system, comprising a first plug connector configured as a plug according to an embodiment of the first aspect of the invention and a second plug connector configured as a socket according to an embodiment of the first aspect of the invention. The plug contact of the first plug connector is electrically connected to the plug contact of the second plug connector. The plug housing of the first plug connector is mechanically connected to the plug housing of the second plug connector so as to withstand at least tensile stress.

Without limiting the scope of the invention in any way, ideas and possible features relating to embodiments of the invention may be considered to be based, inter alia, on the ideas and findings described below.

An electrical plug connector is intended to be connected to another electrical plug connector, which may also be referred to as a mating plug connector, in order to bring the cables contained in the two connectors into electrical contact with each other. In this way, the two connectors form a plug-in connection system. One of the plug connectors may be configured as a plug, that is to say, a male plug connector, whereas the other plug connector is then configured as a socket, that is to say, a female plug connector. The plug connector is of multi-part design and has at least one plug contact, a contact carrier, a plug housing, a primary locking element, and a secondary locking element.

The plug contact is attached to one end of the cable that is to be connected to the cable of a mating plug connector. For this purpose, the cable is generally stripped at its end and is in electrical contact with the plug contact. The plug contact normally surrounds the end of the cable and, for its part, forms contact surfaces via which it may make electrical contact with the contact surfaces of a plug contact of the mating plug connector. The geometry of the plug contact is also adapted to the respective function of the connector, depending on whether the connector is to serve as a plug or a socket. A plug contact configured as a plug is also referred to as a male plug contact or "male insert", whereas a plug contact configured as a socket is sometimes referred to as a female plug contact or "female insert". The plug contact generally consists of or comprises an electrically conductive material such as a metal in particular. In particular, the plug contact may be formed with a suitably punched and/or bent metal sheet.

The contact carrier serves to accommodate and reliably hold the plug contact. For this purpose, with the plug connector in the assembled state, the contact carrier completely or at least partially surrounds the plug contact. When assembling the plug connector, the plug contact is usually inserted in an insertion direction, which usually corresponds to the longitudinal direction of the cable, into a recess in the contact carrier. The contact carrier generally consists of or comprises an electrically insulating material such as a plastic, for example. The contact carrier may be configured as an injection-molded plastic component, for example.

The plug housing is configured to accommodate and reliably hold the contact carrier together with the plug contact disposed therein. With the plug connector in the assembled state, the plug housing generally surrounds the contact carrier completely or at least partially. Dimensions of the plug housing, in particular dimensions in transverse cross-section, are usually significantly larger than those of the contact carrier and the plug contact. The plug housing is configured to be mechanically connected to a plug housing of the mating plug connector and to ensure that the plug contacts of the two plug connectors come into mechanical and electrical contact. The plug housing preferably consists of or comprises an electrically insulating material such as a plastic, but may also consist of or comprise other materials. For example, the plug housing may be configured as an injection-molded plastic component.

The primary locking element serves to fix the plug contact inserted into the contact carrier relative to the contact carrier. In particular, the primary locking element is intended to prevent the plug contact from being moved out of the contact carrier as a result of a force acting on the plug contact and pulling in an axial direction, that is to say, parallel to the longitudinal direction of the cable and preferably against the insertion direction. For this purpose, the primary locking element creates a mechanically robust interaction between the plug contact and the contact carrier. In principle, the primary locking element may be part of the contact carrier, part of the plug contact or both, or may be provided as a separate component.

The secondary locking element also serves to fix the plug contact inserted into the contact carrier relative to the contact carrier. The secondary locking element thus supports the effect of the primary locking element. Therein, the secondary locking element may be configured to act directly on the primary locking element so as to support its locking effect. For example, the secondary locking element may be configured to prevent the primary locking element from being able to move out of a locking position. Alternatively, the secondary locking element may interact directly both with the plug contact and with the contact carrier in order to prevent these two components from moving relative to each other. In this case, the secondary locking element may provide a supplementary locking effect without interacting with the primary locking element, so that it may also be regarded as a second primary locking element. The secondary locking element of the connector described herein is preferably configured according to the last alternative described.

In the case of the plug connector described herein, the secondary locking element in particular is configured, that is to say designed and/or disposed, in a special way, with the contact carrier and the plug contact of the plug connector also being configured in a suitable way for a corresponding interaction with the secondary locking element.

In particular, the secondary locking element is configured as a separate component displaceable relative to the contact carrier. In other words, the secondary locking element should be provided as a stand-alone component which may be manufactured and handled independently of the other components of the plug connector and which may then be installed on the contact carrier during assembly of the plug connector and interact with the plug contact to provide the desired secondary locking.

The secondary locking element, the contact carrier and the plug contact are also specially configured such that the secondary locking element may be moved relative to the contact carrier between an intermediate position and an end position. The configuration of the components is specifically adapted so that the secondary locking element may be displaced from the intermediate position to the end position essentially (i.e., for example, within an angular range of +/−20° or preferably +/−10°) or preferably exclusively in a radially inward direction, i.e., in a direction transverse or preferably perpendicular to the longitudinal direction of the cable and towards a center of the contact carrier. In the intermediate position, the secondary locking element is in a pre-fixed state in which it is reversibly detachably held on the contact carrier. For this purpose, the secondary locking element, when in the intermediate position, may be fixed to the contact carrier by force fitting or reversibly detachable form fitting. In particular, the secondary locking element may be pre-engaged in the pre-fixed state. In the end position, on the other hand, the secondary locking element is in a fixed state in which it is firmly held on the contact carrier, i.e. it may not be released from the contact carrier in a reversible manner or without causing damage. In particular, the secondary locking element may be latched to the contact carrier in the fixed state. In addition, the secondary locking element is configured and, when in the end position, positioned in such a way that it bears, at least in areas, mechanically against the plug contact and, by means of this mechanical contact, secures or locks the plug contact against removal from the contact carrier.

Various advantages may be achieved by the fact that, on the one hand, the secondary locking element is provided as a separate component and, on the other hand, is specially configured to be displaced in cooperation with the contact carrier and the plug contact, preferably only in the radially inward direction, in order to bring it from the pre-fixed intermediate position into the fixed end position. In particular, the secondary locking element may be easily manufactured and provided with the geometry required for the desired configuration. In addition, the secondary locking function may be activated in a particularly simple way, for example by first provisionally attaching the secondary locking element to the contact carrier in its pre-fixed intermediate position and then pushing it into the fixed end position by simply pressing the secondary locking element transversely to the contact carrier, i.e. in the radially inward direction, in order to activate the secondary locking function.

According to one embodiment, the secondary locking element is configured as a one-piece molded part.

Such a one-piece molded part may be designed as an integral component which, for example, is configured in terms of its geometry such that different sub-areas are formed on it to implement different functionalities. It is simple to manufacture, handle and/or install on the contact carrier. The molded part may be made of plastic, for example. It may be manufactured by injection molding, for example. However, the molded part may also be made of other materials such as metal or ceramic. If necessary, it may be surrounded, in particular overmolded, with another material, especially a plastic.

According to one embodiment, the secondary locking element has a locking portion in the form of a rib extending in the radially inward direction. The secondary locking element, the contact carrier and the plug contact are configured such that, in the fixed end position, the locking portion of the secondary locking element passes through an area of the contact carrier and bears under mechanical prestress against a circumferential surface of the plug contact.

In other words, the secondary locking element preferably has a locking portion which protrudes radially inwards as a rib from other areas of the secondary locking element. The secondary locking element together with its locking portion is configured and interacts with the contact carrier and the plug contact in such a way that, when it has been brought into the fixed end position, the locking portion passes through at least an area of the contact carrier and bears under mechanical prestress against the circumferential surface of the plug contact. This lateral bearing under mechanical prestress may create a force fit and/or a form fit between the plug contact and the locking portion of the secondary locking element, whereby the plug contact may be fixed relative to the contact carrier.

According to one embodiment, the plug contact has a cavity on the circumferential surface. The secondary locking element, the contact carrier and the plug contact are configured such that the secondary locking element may only be moved from the pre-fixed intermediate position to the fixed end position when the plug contact is received in a target position in the contact carrier such that the locking portion of the secondary locking element may engage in the cavity of the plug contact.

In other words, a recess forming a cavity may be provided on the circumferential surface of the plug contact. Such a cavity may, for example, be configured as a circumferential groove. The cavity may be positioned on the plug contact in such a way that the locking portion of the secondary locking element may only engage in the cavity of the plug contact when the plug contact has been positioned in a predetermined target position relative to the contact carrier. This target position may, for example, correspond to an intended end position of the plug contact in the contact carrier. On the other hand, it may be provided that the secondary locking element may only be moved from the intermediate position to the end position if its locking portion may engage in the cavity of the plug contact. In this way, it is possible to ensure that the secondary locking element may only be pushed into the fixed end position if the plug contact has previously been arranged correctly in the desired target position in the contact carrier.

According to one embodiment, the secondary locking element has two lever portions in a form of projections projecting in the radially inward direction and at an angle towards a plane of symmetry of the secondary locking element.

In other words, two projections on the secondary locking element, referred to as lever portions, may project radially inwards and at a defined angle. The lever portions may be directed towards a plane of symmetry of the preferably mirror-symmetrical secondary locking element. As explained below, providing such lever portions sections may enable advantageous effects.

In particular, according to one embodiment, the secondary locking element may have two arms. Each of the lever portions is disposed centrally and projecting radially inwards on one of the arms. A first latching hook is formed at a free end of each of the arms. A mating latching element is formed on the contact carrier associated with each of the first latching hooks.

In other words, the secondary locking element may have two arms, at each of whose free ends a latching hook, referred to herein as first latching hook, is provided. The latching hook may, for example, be configured as a catch formed transversely to a longitudinal extension of the respective arm. On each of the arms, one of the lever portions is provided in a central area of the arm and projects radially inwards and at an angle. The combination of the first latching hook and the lever portion on each of the arms enables advantageous functionality, particularly when assembling the plug connector and when transferring the secondary locking element from the pre-fixed intermediate position to the fixed end position.

In particular, according to one embodiment, the secondary locking element and the contact carrier may be configured such that the first latching hooks of the secondary locking element are not latched with the associated mating latching elements in the pre-fixed intermediate position of the secondary locking element, and are latched with the associated mating latching elements in the fixed end position.

In other words, the arm with the first latching hook formed thereon may be configured so as to interact in a latching manner with the mating latching element assigned to it on the contact carrier, in particular to be able to come into form-fitting engagement with this mating latching element when the secondary locking element is pushed into the fixed end position. In the pre-fixed intermediate position, however, the first latching hook should not yet be latched to the mating latching element. This means that the secondary locking element remains reversibly detachable in the intermediate position, but is firmly connected to the contact carrier in the end position.

According to a further specified embodiment, the secondary locking element and the contact carrier may be configured such that, in the intermediate position, the secondary locking element with its lever portions bears under mechanical prestress against an outer surface of the contact carrier.

When the secondary locking element is disposed in the pre-fixed intermediate position, due to the mechanical prestress acting between its lever portions and the outer surface of the contact carrier, it may be sufficiently held against the contact carrier and thus be pre-fixed. A force fit preferably operates between the lever portions and the outer surface of the contact carrier, but not a form fit, in particular not a latching form fit. Due to the force fit achieved in this way, the secondary locking element may initially be attached to the contact carrier in a temporary and reversibly detachable manner when assembling the plug connector. The force fit may prevent the secondary locking element from having to be permanently held in place during subsequent steps of the assembly process, for example. That is to say, the secondary locking element may initially be partially pushed onto the contact carrier, for example in a radial direction, until it is pre-fixed due to the interaction between its lever portions and the outer surface of the contact carrier, so that it then no longer needs to be held in place by external measures.

According to one embodiment, the secondary locking element and the contact carrier may be configured such that, when the secondary locking element is displaced from the intermediate position to the end position, the two arms are spread apart from one another due to the lever portions projecting therefrom being supported on associated counter-pressure surfaces on the contact carrier, such that the first latching hooks may engage behind the mating latching elements.

That is to say, on the one hand a geometry and a position of the lever portions on the arms of the secondary locking element and on the other hand a geometry and a position of associated counter-surfaces on the contact carrier may be configured such that the lever portions are supported on the associated counter-pressure surfaces in a specific manner when the secondary locking element is pushed from the intermediate position into the end position. The support should be provided in such a way that the two arms of the secondary locking element are successively spread apart from one another during the displacement of the secondary locking element into the end position. Due to this spreading, in particular a distance between the opposing lever portions and a distance between the opposing first latching hooks provided at the ends of the two arms may be temporarily increased. Due to this temporarily increased distance, the first latching hooks may, for example, be pushed over the associated mating latching elements and engage behind them, i.e. resulting in a configuration whereby the first latching hooks undercut the mating latching elements. Due to the temporary spreading of the arms of the secondary locking element caused by the lever portions and the associated counter-pressure surfaces, the secondary locking element may easily be pushed in the radially inward direction into the fixed end position.

According to one embodiment, the secondary locking element also has two second latching hooks. Each of the second latching hooks is separated from an associated one of the arms by a separation gap and is disposed axially spaced from the lever portion projecting from the associated arm.

The two second latching hooks may serve to additionally fix the secondary locking element on the contact carrier. The fact that the second latching hooks are each axially spaced and disposed separately from the arms of the secondary locking element via a separation gap means that they may be actuated independently of the first latching hooks, i.e. they may engage with associated mating latching elements, for example. In particular, this allows an axial functional division or separation of the first and second latching hooks.

According to a further embodiment, the secondary locking element also has two third latching hooks, each of the third latching hooks being disposed at an axial distance from an associated one of the second latching hooks.

These third latching hooks may provide further fixing of the secondary locking element on the contact carrier. The fact that they are axially spaced from the second latching hooks means that a more extensive or larger-area fixing effect may be achieved. Furthermore, here too this allows an axial functional division or separation of the first, second and third latching hooks.

According to one embodiment, the primary locking element has at least one leg, the leg extending from the contact carrier in a direction parallel to the longitudinal direction. The leg has a primary locking latching hook at its unsupported end and is elastically prestressed in a direction transverse to the longitudinal direction in the radially inward direction towards the plug contact.

In other words, the primary locking element may be configured in a special way. For this purpose, the primary locking element may have the leg extending essentially parallel to the longitudinal direction, the leg extending from the contact carrier and preferably formed in one piece with it. At its unsupported end, the leg has a latching hook, which is referred to herein as the primary locking latching hook. The leg is configured and connected to the contact carrier in such a way that it may spring elastically in the inward direction and is prestressed towards the plug contact. When the plug contact is pushed into the contact carrier, the primary locking latching hook may thus engage resiliently in a cavity or groove provided on the outer surface of the plug contact, for example, and thus create a latching effect between the plug contact and the contact carrier. Due to the special design of the primary locking element, such latching may withstand particularly high tensile forces acting on the cable.

According to one embodiment, the contact carrier has a stud projecting in a radially outward direction. In this case, the secondary locking element has a constricted recess with a wide first area, a wide second area and a narrowed transition area between the first and second areas. The secondary locking element and the contact carrier are configured such that the stud engages in the wide first area of the constricted recess when the secondary locking element is in the pre-fixed intermediate position, and the stud passes through the narrowed transition area into the wide second area of the constricted recess when the secondary locking element is displaced from the pre-fixed intermediate position to the fixed end position.

In other words, the contact carrier may have a projection on its outer surface that projects radially outwards, which is referred to herein as a stud. The stud may be formed in one piece with the contact carrier. A constricted recess associated with this stud is then provided in the secondary locking element. The constricted recess may be configured as a through-opening in the secondary locking element. The stud may engage in the recess. A plurality of studs and, associated with these, a plurality of constricted recesses may also be provided at different positions on the contact carrier or the secondary locking element.

The combination of a stud on the contact carrier and a constricted recess on the secondary locking element may be used to pre-fix the secondary locking element on the contact carrier, i.e. to attach it to the contact carrier in the pre-fixed intermediate position so that it may be reversibly detached, for example. The recess in the secondary locking element is locally constricted so that it has a narrowed transition area between the wide first area and the wide second area. In the pre-fixed intermediate position, the stud of the contact carrier engages in the wide first area of the recess of the secondary locking element and ensures the desired pre-fixing of the same. When the secondary locking element is then pushed from the intermediate position to the end position, the stud and the constricted recess move relative to each other, with the stud being displaced through the narrowed transition area into the wide second area of the constricted recess. In this state, the secondary locking element is then firmly fixed to the contact carrier, i.e. it may no longer be reversibly detached.

It should be noted that some of the possible features and advantages of the invention are described herein with reference to various embodiments, on the one hand, of the connector described herein and, on the other hand, with reference to a plug-in connection system to be formed therewith. A person skilled in the art will recognize that the features may be suitably combined, transferred, adapted or interchanged to arrive at further embodiments of the invention.

BRIEF DESCRIPTION OF DRAWINGS

Advantageous embodiments of the invention are further explained below with reference to the accompanying drawings, in which neither the drawings nor the explanations are to be construed as limiting the invention in any way.

The Figures are merely schematic and not to scale. Identical reference signs in the different drawings denote identical or identically acting features.

DETAILED DESCRIPTION

Figure 1:
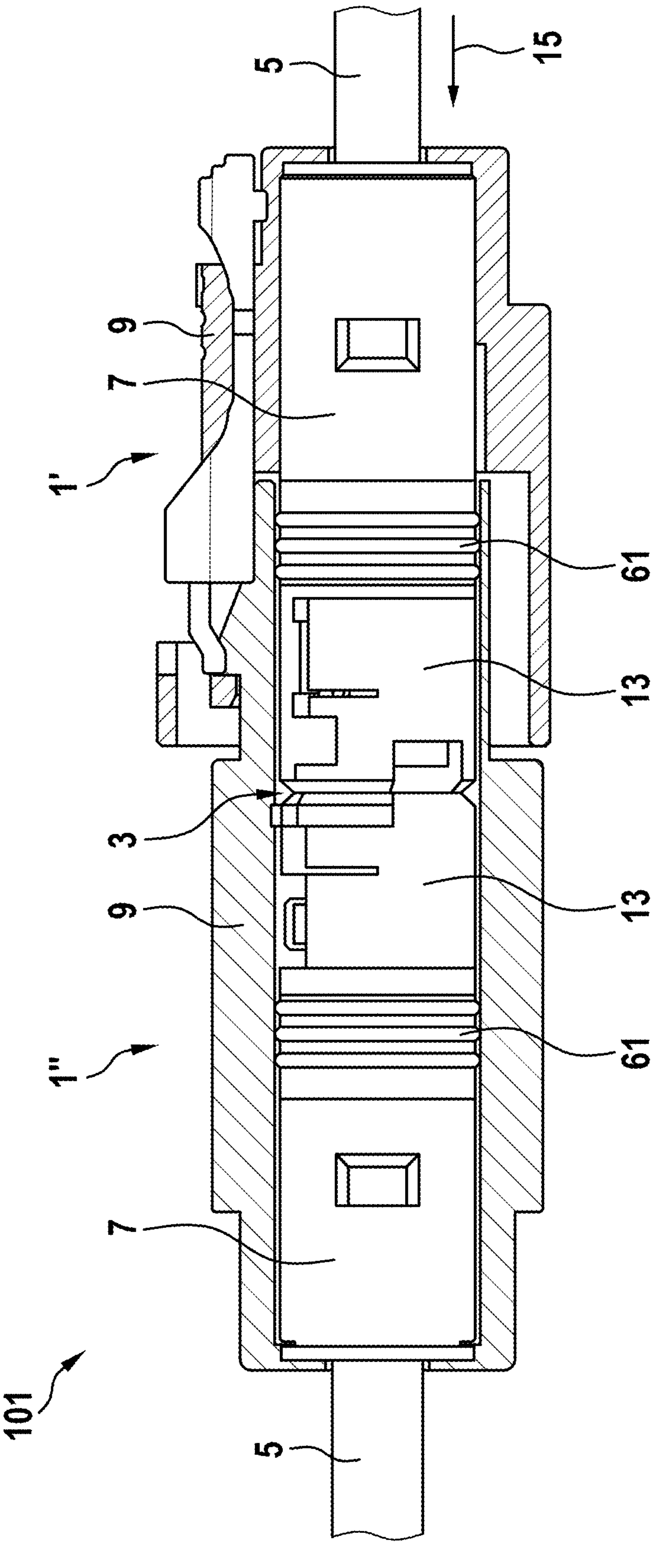
FIG. 1 shows a cross-sectional view through a plug-in connection system according to an embodiment of the present invention.

FIG. 1 illustrates a plug-in connection system 101 with two plug connectors 1', 1" plugged together. A first plug connector 1' is configured as a plug, whereas a second plug connector 1" is configured as a socket.

FIGS. 2A-F show successive steps of an assembly process for assembling the plug connector 1.

The plug connector 1 comprises a plug contact 3 at one end of a cable 5, a contact carrier 7 and a plug housing 9. As explained in more detail below, the plug connector 1 also has a primary locking element 11 (not shown in FIGS. 1 and 2) and a secondary locking element 13. Furthermore, the plug connector 1 is sealed by means of seals 61.

In other words, the plug connector 1 has a data cable 5 stripped at an end with plug contacts 3 which are accommodated within the contact carrier 7, the contact carrier 7 being disposed in the plug housing 9.

Figure 2A:
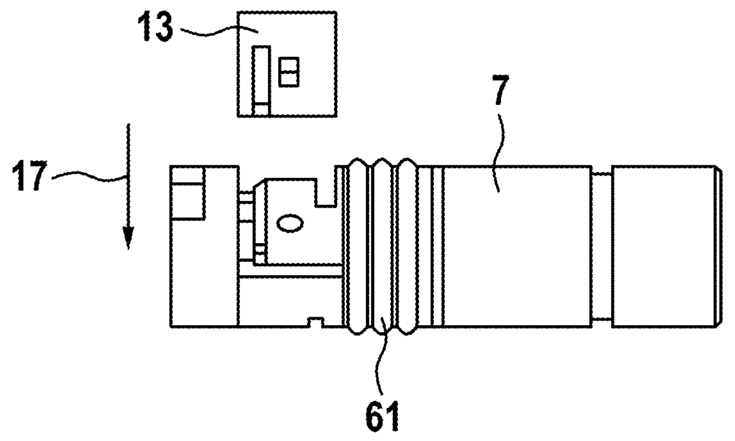
FIG. 2A illustrates a stage of an assembly process for a plug connector according to an embodiment of the present invention.
Figure 2B:
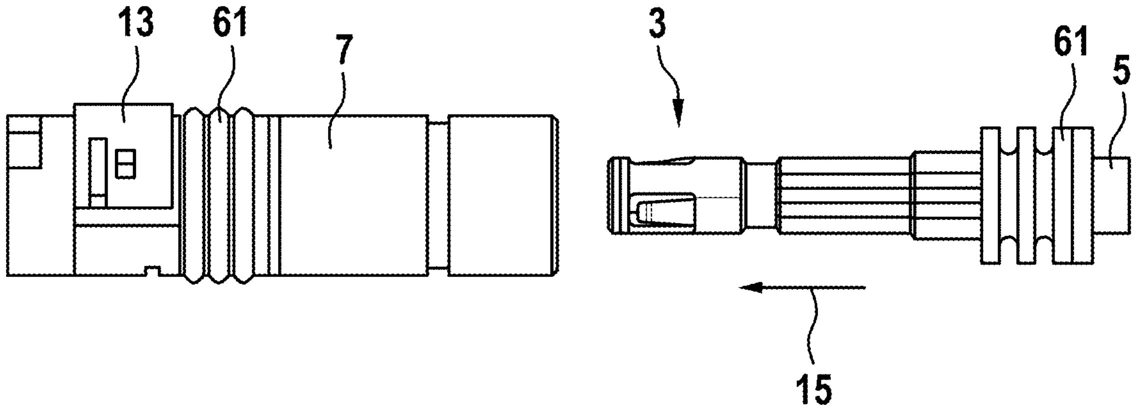
FIG. 2B illustrates a stage of an assembly process for a plug connector according to an embodiment of the present invention.
Figure 2C:
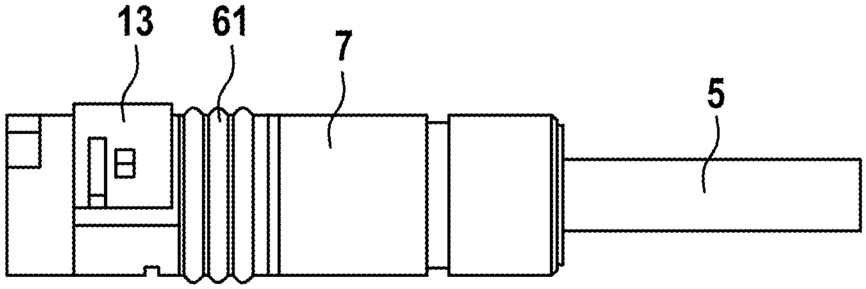
FIG. 2C illustrates a stage of an assembly process for a plug connector according to an embodiment of the present invention.
Figure 2D:
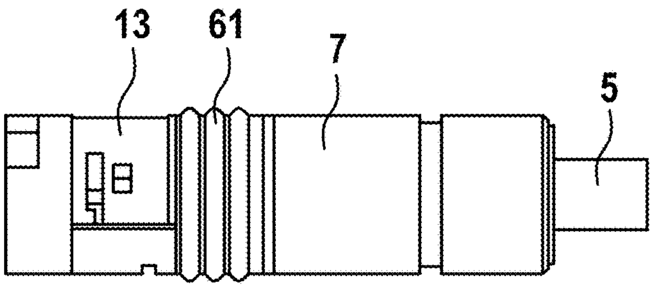
FIG. 2D illustrates a stage of an assembly process for a plug connector according to an embodiment of the present invention.
Figure 2E:
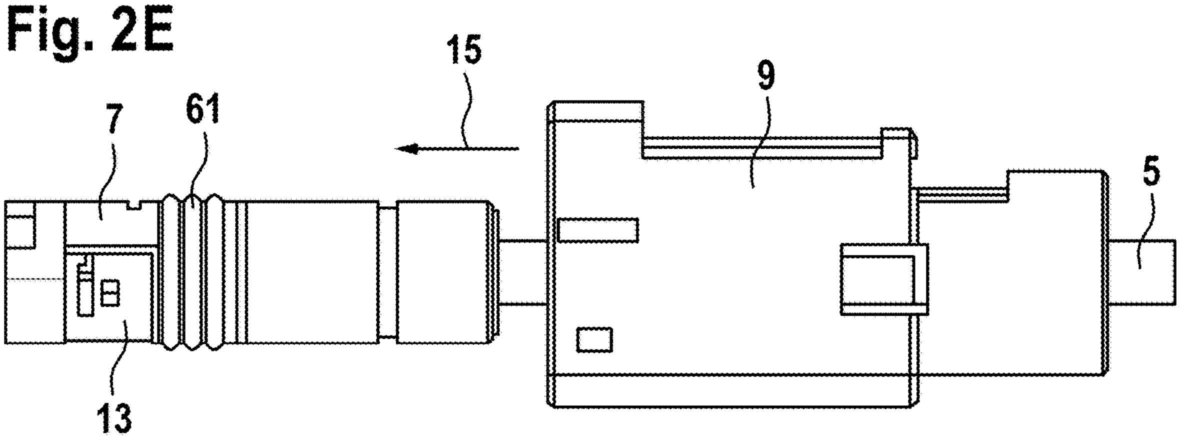
FIG. 2E illustrates a stage of an assembly process for a plug connector according to an embodiment of the present invention.
Figure 2F:
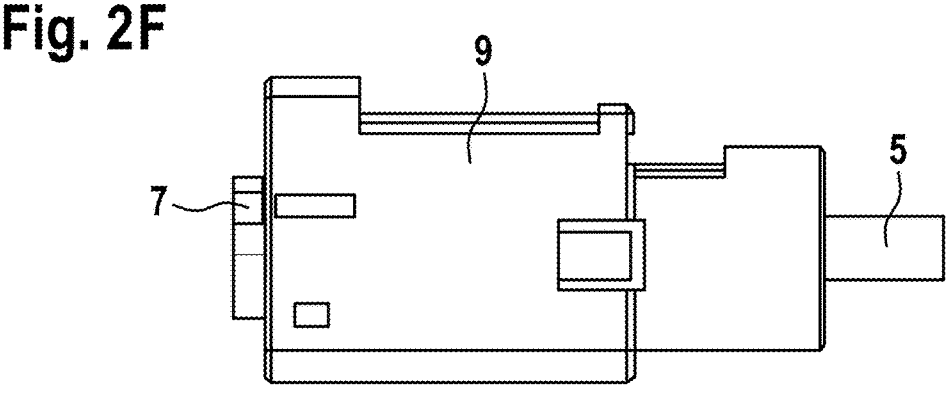
FIG. 2F illustrates a stage of an assembly process for a plug connector according to an embodiment of the present invention.

To assemble the plug connector 1, the contact carrier 7 and the secondary locking element 13 are first provided as separate components (FIG. 2A). The secondary locking element 13 is then reversibly detachably pre-fixed to the contact carrier 7 by pushing it laterally onto the contact carrier in a radially inward direction 17 to a pre-fixed intermediate position (FIG. 2B). The plug contact 3 with the cable 5 attached to it is then pushed in a longitudinal direction 15 of the cable 5 into the contact carrier 7 (FIG. 2C). When the plug contact 3 has reached a target position within the contact carrier 7, the secondary locking element 13 may be moved from its intermediate position to a fixed end position by displacing it further towards the contact carrier 7 in the radially inward direction 17 (FIG. 2D). The plug housing 9 is then pushed onto the contact carrier 7 from behind in the longitudinal direction 15 (FIG. 2E) until both components are correctly positioned relative to each other and latch together (FIG. 2F).

It is known to fasten the plug contacts 3 inserted into the contact carrier 7 to the contact carrier 7 by means of a primary locking mechanism in such a way that they may no longer fall out of the contact carrier 7 in the longitudinal direction 15, i.e. against the insertion direction. The primary locking mechanism is configured, for example, as a latching hook that is elastically resiliently disposed on the contact carrier 7 and, in a latching position, engages in a groove of the plug contact 3 accommodated in the contact carrier 7.

It is further known to provide a secondary locking mechanism which also secures the plug contacts 3 in the contact carrier 7. In a first embodiment, the secondary locking mechanism may be configured to act on the primary locking mechanism in such a way that the secondary locking mechanism prevents the primary locking mechanism from detaching. In a second embodiment, the secondary locking mechanism may be configured to fix the plug contacts 3 directly on the contact carrier 7 and thus act in addition to the primary locking mechanism, i.e. as a second primary locking mechanism, so to speak.

The plug connector described herein is equipped with a secondary locking element 13 (hereinafter referred to as "SLE" for short) pluggable exclusively in the radial direction, i.e. exclusively transversely or perpendicularly to the longitudinal direction 15 or to a longitudinal extension of the plug contacts 3 or the cable 5. The SLE 13 of the secondary locking mechanism is configured as a molded part manufactured separately from the contact carrier 7 and the plug housing 9, in particular from a plastic, but a metal blank (possibly overmolded with plastic) or a ceramic molded part is also possible.

The SLE 13 is brought from a pre-fixed intermediate position, in which the SLE 13 is fixed (clamped) but still detachably disposed on the outside of the contact carrier by an exclusively radial movement (i.e. for example by pressing towards the plug contact 3), into a fixed end position, in which the SLE 13 is non-detachably and fixedly disposed on the contact carrier 7. Only in the end position does the SLE 13 fix the plug contact 3 on the contact carrier 7. As explained in detail below, a locking portion 19 of the SLE 13 passes through the contact carrier 7 and bears under mechanical prestress directly against the plug contact 3 (i.e. engages, for example, in a cavity 25, for example in the form of a groove in the plug contact 3). The SLE 13 may preferably only be moved from the intermediate position to the end position if the cavity 25 in the plug contact 3 lies in the (radial) insertion direction of the SLE 13.

The SLE 13 has an elongated, generally crowned (i.e. curved) shape and, in the end position, is fixed to the contact carrier 7 in a mechanically stressed manner.

Figure 3A:
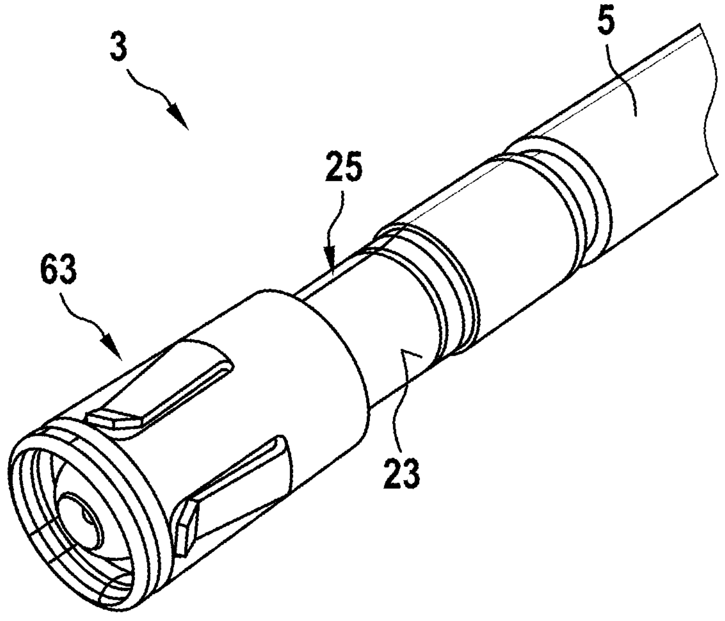
FIG. 3A shows plug contacts in a form of a so-called 'female' insert.

FIG. 3A shows a female insert, i.e. a cable end that is formed with a 'female' plug contact 3. As explained below, a primary locking element (for example in the form of a primary locking latching hook 49 on the contact carrier 7) and the secondary locking mechanism described below may engage with the SLE 13 in a groove-like cavity 25 adjacent to a spring basket 63.

Figure 3B:
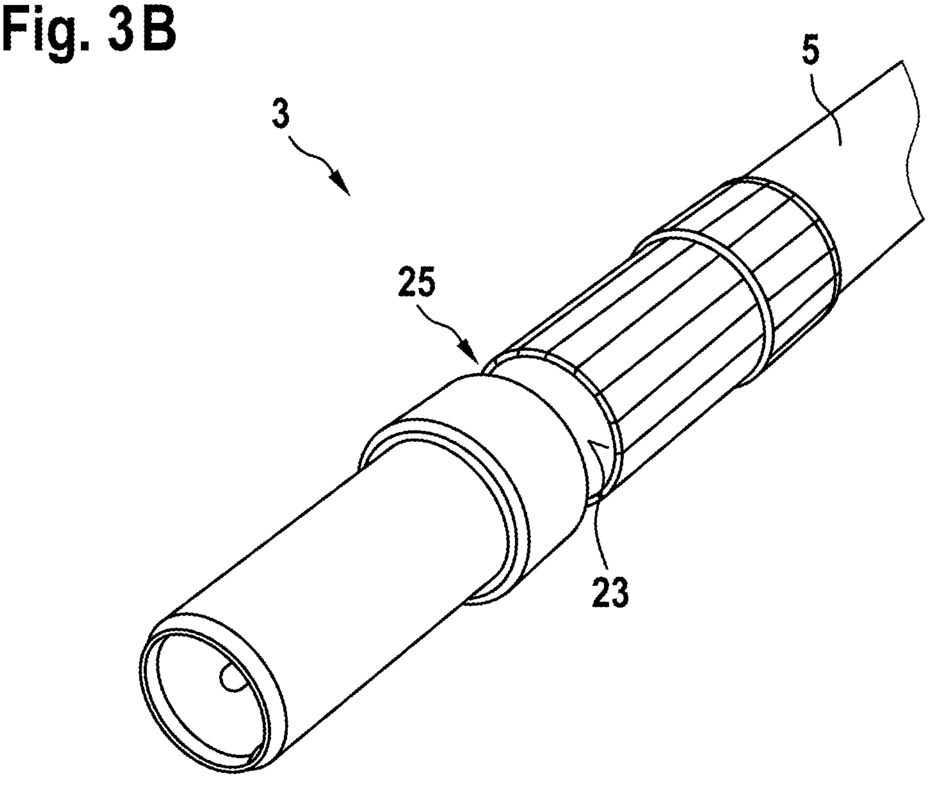
FIG. 3B shows plug contacts in a form of a so-called 'male' insert.

FIG. 3B shows a male insert, i.e. a cable end that is formed with a 'male' plug contact 3. Again, a primary locking mechanism (such as a latching hook on the contact carrier) may engage in the groove-like cavity 25.

Figure 4A:
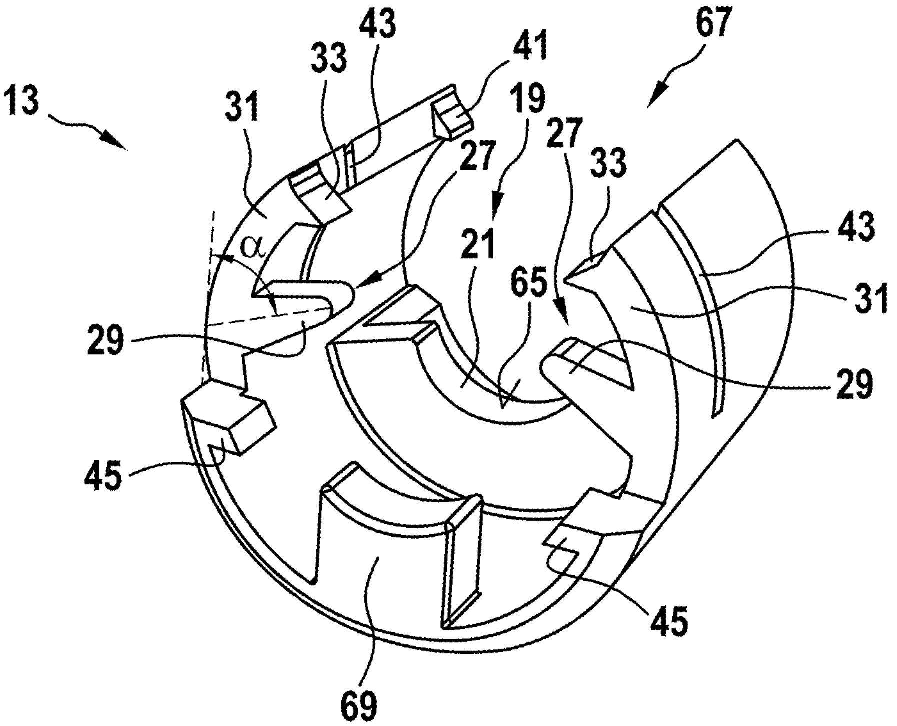
FIG. 4A shows the secondary locking element for the male insert in a perspective view.
Figure 4B:
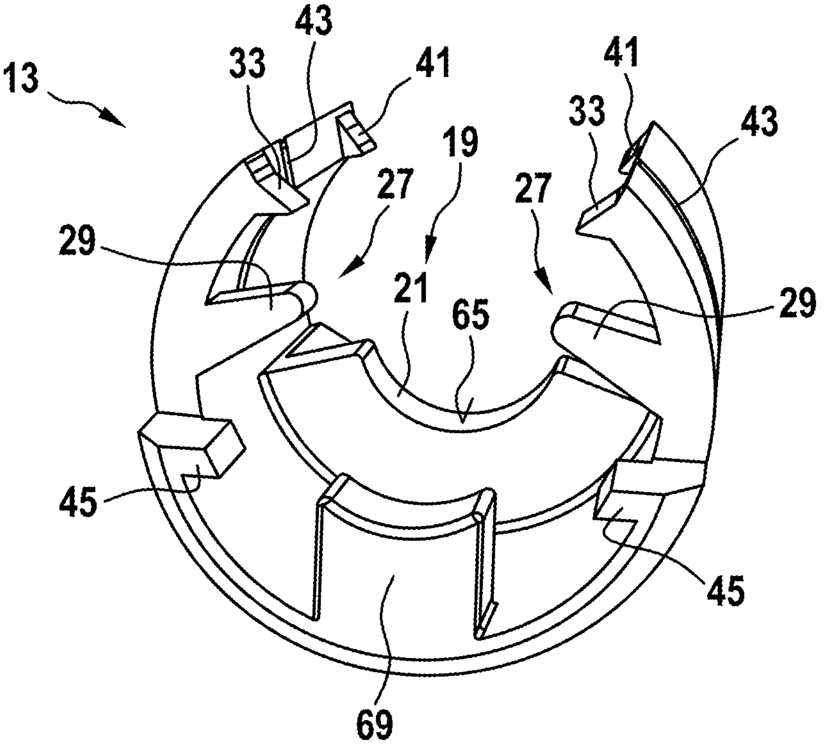
FIG. 4B shows the secondary locking element for the male insert in a perspective view.

The SLE 13 for the male insert in FIG. 3B is shown in different perspective views in FIGS. 4A, B. The SLE 13 is configured as a one-piece molded part. It has a generally longitudinally slotted cylindrical shape. In other words, the SLE 13 is configured with a circular outer contour and is provided with an opening 67 in an area of its side as shown above in the Figure. A width of the opening 67 corresponds approximately to a width or diameter of the male insert. In particular, the SLE 13 is mirror-symmetrical to an imaginary center plane. The SLE 13 also has various functional portions on a curved inner side.

In particular, the SLE 13 has a locking portion 19, which is configured as a rib 21 projecting transversely to the longitudinal direction. An arc-segment-shaped closure surface 65 of the locking portion 19 is matched to a circumferential surface 23 of the male insert plug contact 3 in the area of the cavity 25 (FIG. 3B), i.e. is formed with a contour complementary to this circumferential surface 23, and in the locked end position bears against the circumferential surface 23 in the area of the cavity 25. The secondary locking element 13, the contact carrier 7 and the plug contact 3 are configured and adapted to each other such that, when the secondary locking element 13 has been positioned in the fixed end position, the locking portion 19 passes through an area of the contact carrier 7 and bears under mechanical prestress against the circumferential surface 23 of the plug contact 3 in the area of the groove-shaped cavity 25. Consequently, the plug contact 3 may be secured in the contact carrier 7 by the locking portion 19 of the secondary locking element 13 against the removal from the contact carrier 7 by pulling in a direction parallel to the longitudinal direction 15 of the cable 5.

The SLE 13 also has two lever portions 27 lying opposite one another, on which a protrusion 29 projects at a defined angle α towards a plane of symmetry of the SLE 13. The angle α refers (see FIG. 4A) to a main direction of extension of the lever portion 27 in relation to a tangent to an outer circumference of the cylindrical SLE 13. The lever portion 27 is formed approximately centrally on an arm 31 which is provided on the SLE 13 and on whose free end a first latching hook 33 is formed.

Separated from the arm 31 by a separation gap 43, a second latching hook 41 is formed axially spaced from the lever portion 27. A third latching hook 45 is formed axially separated again. A support portion 69 is also formed essentially centrally relative to the plane of symmetry.

A distance between the opposite ends of the lever portions 27 is dimensioned such that, when the SLE 13 is attached to the contact carrier 7, these lever portions 27 bear under prestress, i.e. under an elastic deformation of the SLE 13, against the outside of the contact carrier 7. In particular, the SLE 13 and the contact carrier 7 are configured such that, in the intermediate position, the SLE 13 with its lever portions bears under mechanical prestress against an outer surface of the contact carrier 7. This allows the SLE 13 to be pre-fixed to the contact carrier 7 in the intermediate position.

Furthermore, the SLE 13 and the contact carrier 7 are configured such that, when the SLE 13 is displaced from the intermediate position to the end position, the two arms 31 are spread apart from one another due to the fact that their lever portions 27 projecting therefrom are supported on associated counter-pressure surfaces 39 (see FIG. 13) on the contact carrier 7 in such a way that the first latching hooks 33 may engage behind central mating latching elements 35.

Figure 5A:
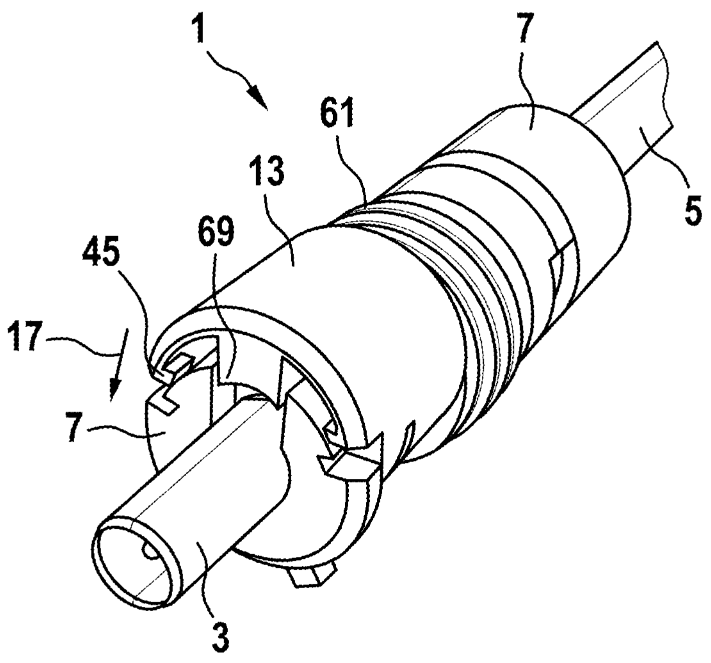
FIG. 5A shows the contact carrier with the male insert (FIG. 3B) with the secondary locking element in a pre-fixed intermediate position (FIG. 5A).
Figure 5B:
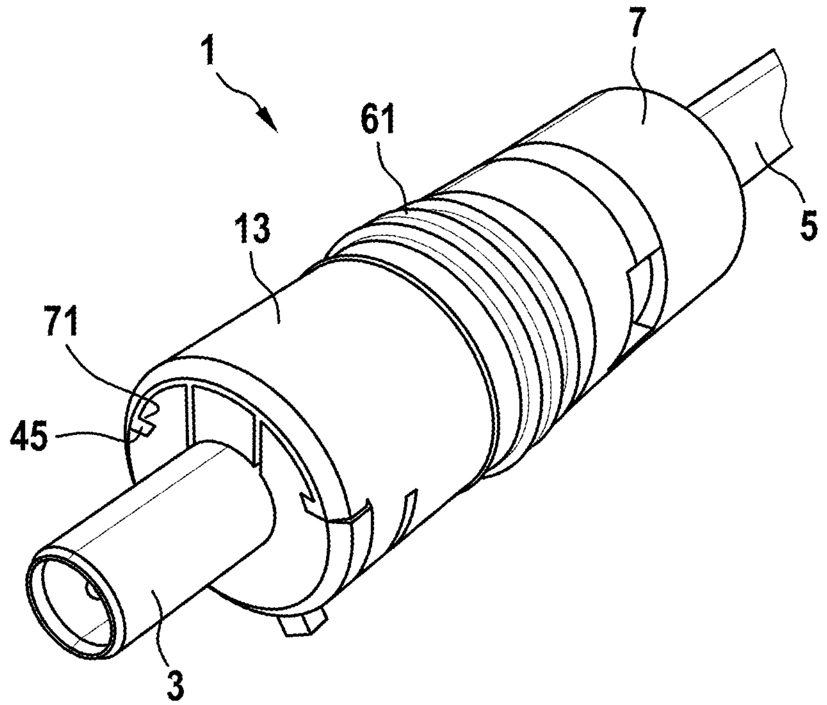
FIG. 5B shows the contact carrier with the male insert (FIG. 3B) with the secondary locking element in a fixed end position (FIG. 5B).

With the SLE 13 in the end position, the latching hooks 33, 41, 45 engage in associated mating latching elements 35, 71 (undercuts) on the contact carrier 7 (see FIG. 5B and shown analogously for the female insert in FIGS. 7, 8A, 8B, 9 and 13). In other words, the SLE 13 with its arms 31 and the lever portions 27 projecting therefrom and the contact carrier 7 are configured such that, in particular, the first latching hooks 33 are not latched with the associated mating latching elements 35 in the pre-fixed intermediate position of the SLE 13, and are latched with the associated mating latching elements 35 in the fixed end position.

FIG. 5A shows the SLE 13 from FIGS. 4A, B in its pre-fixed intermediate position. The SLE 13 may be moved to the fixed end position shown in FIG. 5B by displacement in the radially inward direction 17, i.e. by radial pressure. In particular, it may be seen that the third latching hook 45 engages in an associated undercut on the contact carrier 7 formed by the mating latching element 71. The same applies to the first and second latching hooks 33, 41.

Figure 6A:
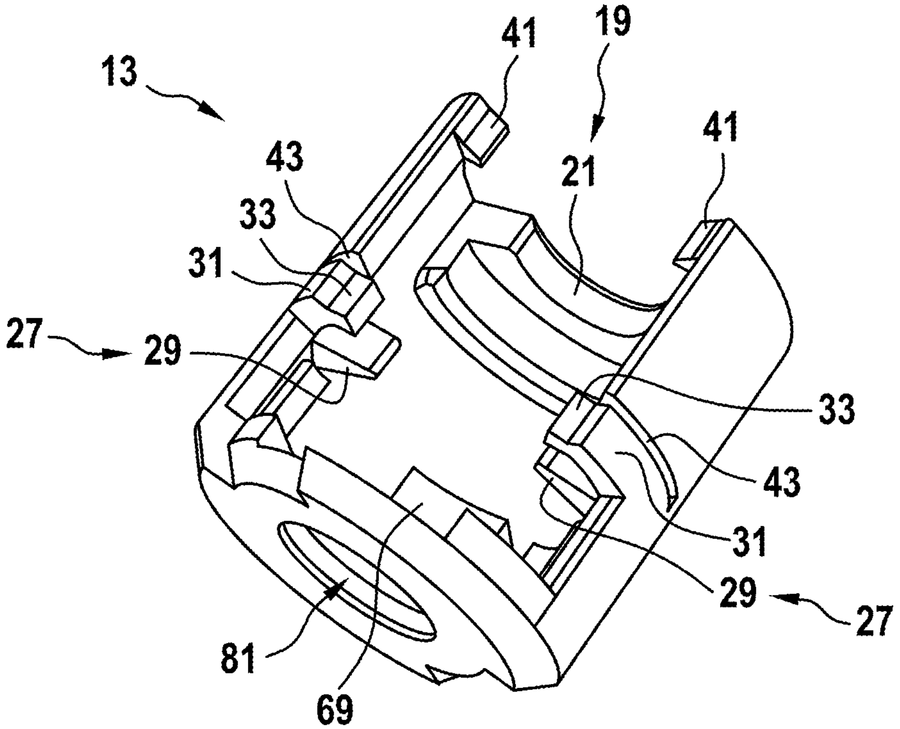
FIG. 6A shows the secondary locking element for the female insert (FIG. 3A) in a perspective view.
Figure 6B:
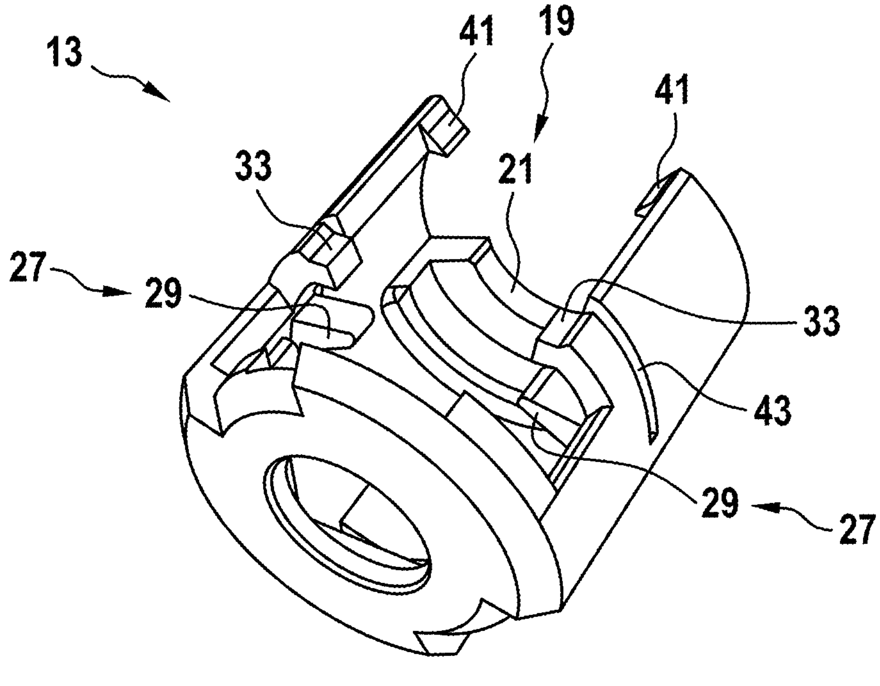
FIG. 6B shows the secondary locking element for the female insert (FIG. 3A) in a perspective view.

FIGS. 6A, b show an SLE 13 for a plug contact 3 in the form of a female insert. Also visible here are the lever portions 27 in the form of protruding formations 29, a separation gap 43, first latching hooks 33 and second latching hooks 41, and a locking portion 19 in the form of a rib 21. In contrast to the SLE 13 of the male insert shown in FIGS. 4A, B, one end face is configured as a closed ring.

Figure 7A:
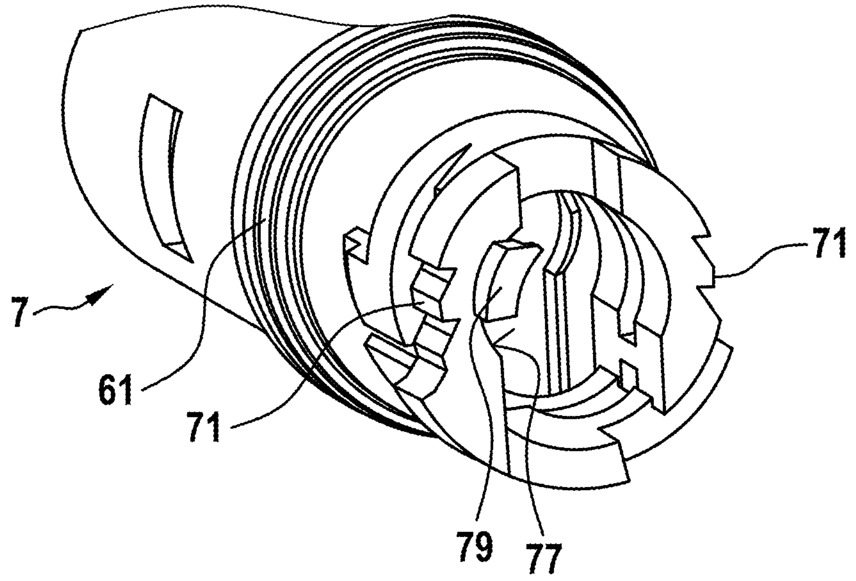
FIG. 7A shows a perspective view of the contact carrier for accommodating the female insert (FIG. 3A), without insert and without secondary locking element.

FIG. 7A shows a perspective view of the contact carrier 7 with which the SLE 13 of the female insert is intended to interact. Among other things, mating latching elements 71 at a front side may be seen. The contact carrier 7 also has a tooth-like projection 79 at its axial front end and adjacent to an inner circumference 77 of the contact carrier 7. The tooth-like projection 79 protrudes from the end face of the contact carrier 7 in the axial direction and projects at least slightly inwards in the radial direction beyond the inner circumference 77 of the contact carrier 7. This tooth-like projection 79 acts as a stop when the female insert is introduced and forms a radially protruding latch that limits the insertion of the female insert.

Figure 7B:
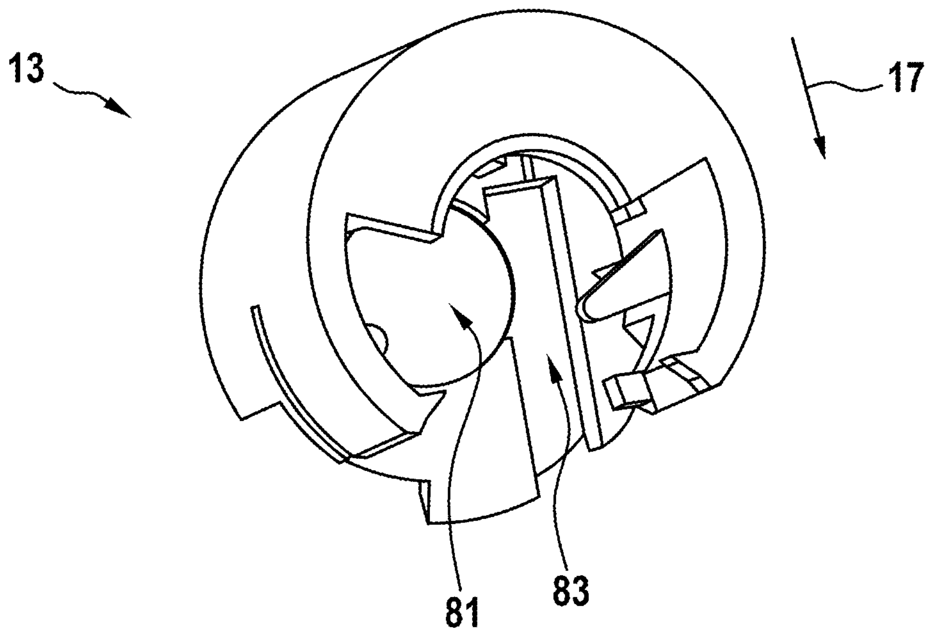
FIG. 7B shows a perspective view of the contact carrier for accommodating the female insert (FIG. 3A) and a secondary locking element adapted to interact with this contact carrier.

FIG. 7B illustrates an SLE 13 which is specially designed to interact with the contact carrier 7 shown in FIG. 7A. Since the SLE 13 is to be pushed over the contact carrier 7 in the radially inward direction 17, the tooth-like projection 79 requires the SLE 13 to be adapted in such a way that a groove-like cavity 83 is provided laterally next to the rear end-face opening 81 or bore, which extends approximately tangentially to the opening 81. The tooth-like projection 79 may be guided in this cavity 83 in order to enable bringing the SLE 13 into the pre-fixed intermediate position.

Figure 8A:
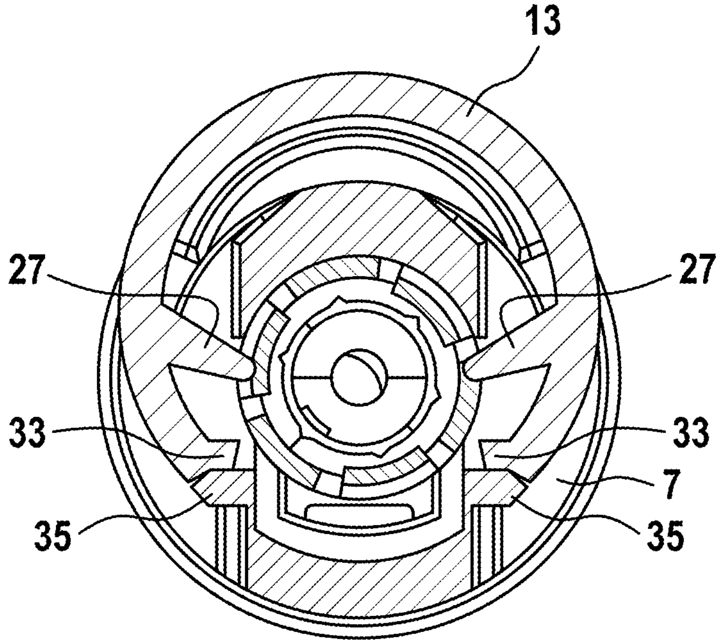
FIG. 8A shows the female contact carrier (FIG. 3A) with the secondary locking element in a pre-fixed intermediate position, the sectional plane lying in the area of the lever of the secondary locking element.

FIG. 8A shows the contact carrier 7 from FIG. 7 with the SLE 13 from FIGS. 6A, B in the pre-fixed intermediate position. It may be seen that the two lever portions 27 bear laterally against the outside of the contact carrier 7. The first latching hooks 33 rest on the mating latching elements 35 and do not yet engage behind the mating latching elements 35.

Figure 8B:
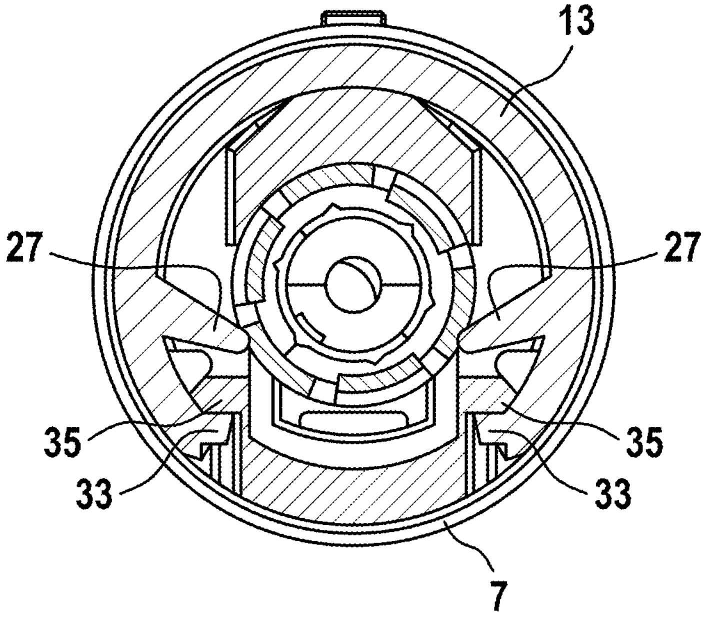
FIG. 8B shows the female contact carrier (FIG. 3A) with the secondary locking element in a fixed end position, the sectional plane lying in the area of the lever of the secondary locking element.

It may also be seen in FIG. 8A that an upper part of the SLE 13 is not flush or aligned with the contact carrier 7, but protrudes above an outer boundary of the contact carrier 7, so that a plug housing 9 may not yet be pushed over the contact carrier 7 in this intermediate position. The plug housing 9 may only be pushed over the contact carrier 7 (i.e. perpendicular to the drawing plane) when the SLE 13 is in the fixed (locked) end position, as shown in FIG. 8B.

Starting from the intermediate position (FIG. 8A), in which the SLE 13 may be reversibly pre-fixed on the contact carrier 7 due to the adjacent lever portions 27, the SLE 13 is brought into the end position by a purely inward radial push (i.e. a push towards the contact carrier 7).

In the end position (FIG. 8B), the first latching hooks 33 engage over the associated mating latching elements 35 on the contact carrier 7, as do the second and third latching hooks 41, 45 (not shown, as they are outside the drawing plane). Moreover, the lever portions 27 are tilted slightly and brought into a top dead center position. In this position, the SLE 13 may no longer be detached from the contact carrier 7; in particular, the SLE 13 is braced against the contact carrier 7 due to inherent mechanical tension.

Figure 9:
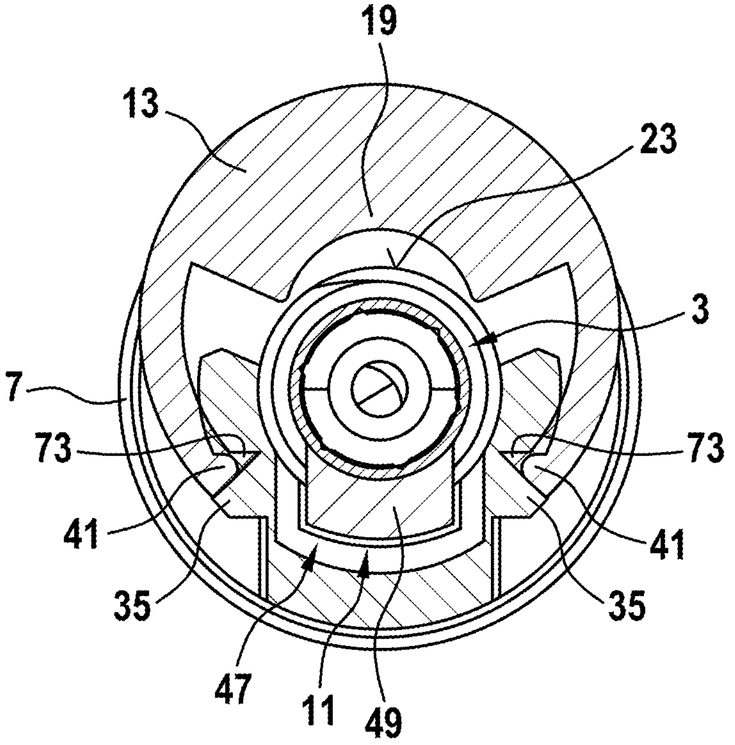
FIG. 9 shows the female contact carrier from FIG. 8A, the sectional plane lying in the area of the locking portion of the secondary locking element.

FIG. 9 shows a cross-sectional view through the contact carrier 7 shown in FIG. 8A with the SLE 13 from FIG. 6A, B. In the illustration in FIG. 9, the sectional plane is positioned so that it intersects the locking portion 19 and the second latching hooks 41. It may be seen that the ends of the second latching hooks 41 are received and pre-fixed in a retaining slot 73 on the contact carrier 7. When the SLE 13 is moved further in a radial direction, the locking portion 19 is almost form-fitted on the circumferential surface 23 of the insert plug contact 3. In the end position, the ends of the second latching hook 41 engage over the retaining slot 73 and fix the SLE 13 to the contact carrier 7 with a slight inherent elastic tension. For this purpose, the locking portion 19 engages directly with the insert through a gap in the contact carrier 7.

Figure 10:
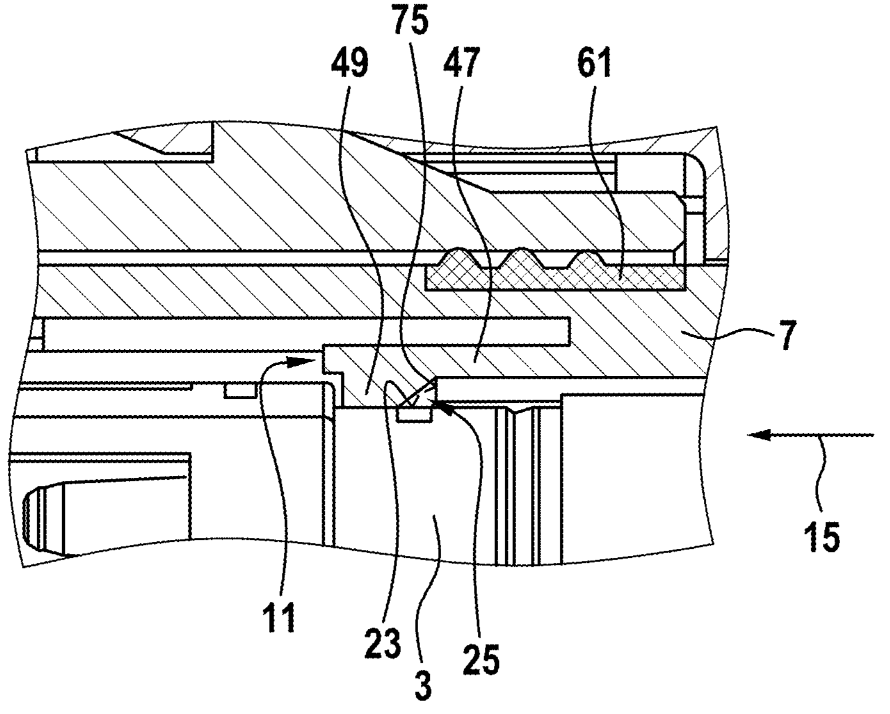
FIG. 10 shows, for a female contact carrier, a primary latching hook for the female insert interacting with an edge.

FIG. 9 also shows a cross-sectional view of a primary locking latching hook 49 of a primary locking element 11. The primary locking latching hook 49 is disposed outside the image plane on the contact carrier 7 as a freely radially elastically displaceable leg 47 (for example as a tab) and engages in the insert of the plug contact 3 in the area of the cross-sectional view. It may be seen that the SLE 13 of the secondary locking mechanism is disposed radially opposite the primary locking latching hook 49 of the primary locking element 11. As shown in the partial sectional view in FIG. 10, the leg 47 with the primary locking latching hook 49 extends essentially in the longitudinal direction 15 of the cable 5 and is elastically prestressed on the circumferential surface 23 in the area of the groove-like cavity 25 on the plug contact 3 on one flank of the cavity 25, which is located in the cable direction, i.e. in the direction in which a tensile stress acts, so that the primary locking mechanism imparts an increased pull-off force. FIG. 10 shows a partially sectioned view of the primary locking latching hook 49 of the primary locking mechanism. With a tensile force acting in the cable direction (towards the right of the Figure), the primary locking latching hook 49 is pressed against a right-hand slot edge 75, which serves as a counter-bearing or stop.

Figure 11A:
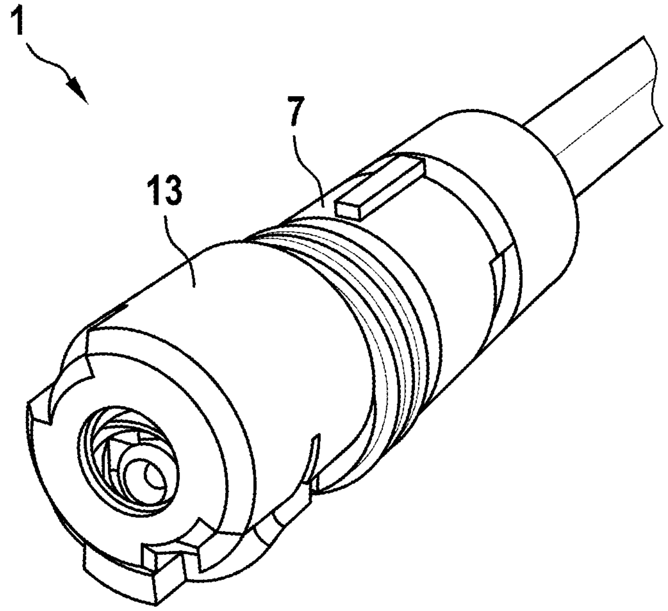
FIG. 11A shows the contact carrier with the female insert (FIG. 3A) in a pre-fixed intermediate position.
Figure 11B:
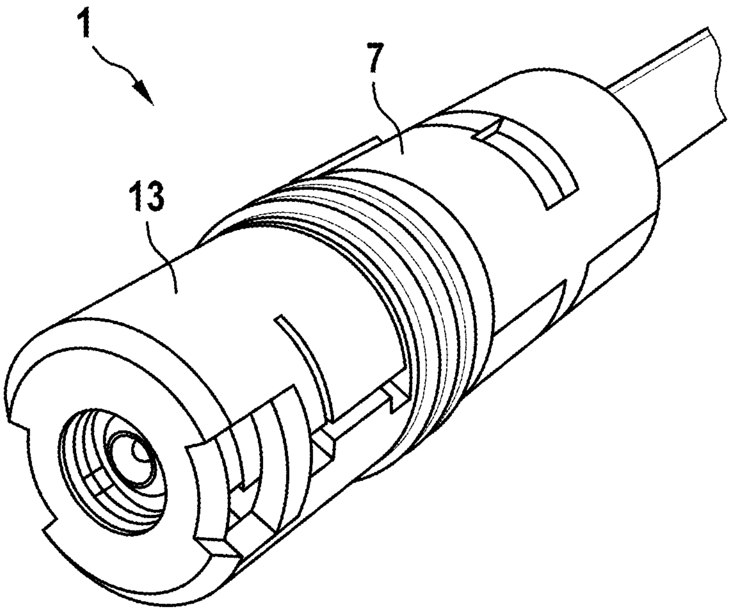
FIG. 11B shows the contact carrier with the female insert (FIG. 3A) in a fixed end position.

FIG. 11A shows a perspective view of the plug connector 1 with the plug contact 3 configured as a female insert in the pre-fixed intermediate position. FIG. 11B accordingly shows the plug connector 1 in the fixed end position. It may be seen that, in the intermediate position, the SLE 13 still protrudes laterally and radially beyond the outer circumference of the contact carrier 7. In the end position, the SLE 13 is essentially aligned with the contact carrier 7, i.e. the outer circumference of the SLE 13 is essentially flush with the outer circumference of the contact carrier 7. While the SLE 13 in the intermediate position would hinder correct assembly of the plug connector 1, in particular the pushing-on of the plug housing 9, the plug connector 1 may be assembled correctly once the SLE 13 has been moved to its end position.

FIG. 1 shows a view of a plug-in connection system 101 in which the plug connector 1' with the male plug contact 3 and the mating plug connector 1" with the female plug contact 3 are each configured as described above, i.e. with a pull-off force increased in the longitudinal direction 15 of the respective cable 5 by the orientation of the primary locking mechanism and also by the respective SLE 13, which comprises a curved molded part, the molded part having on the inside facing the cable 5 at least one clamping element, which is configured as opposing lever portions 27, and at least one second or third latching element or latching hook 41, 45 (preferably axially spaced from the lever portions 27). Preferably, a first latching element or latching hook 33 is also provided in the circumferential direction of the lever portion 27.

The plug-in connection system 101 is illustrated in FIG. 1 in a configuration in which, on being assembled, the SLE 13 on the plug connector 1' has been correctly moved to its end position. It may be seen that this SLE 13 does not protrude laterally beyond the circumference of the associated contact carrier 7, which would otherwise prevent the two plug housings 9 of the respective plug connectors l', 1" from being pushed together and latched to one another in the intended manner. In such a case of incorrect assembly, this could be detected when assembling the plug-in connection system 101, so that the incorrect assembly of the SLE 13 on the plug connector 1' would noticed by this point at the latest.

Figure 12:
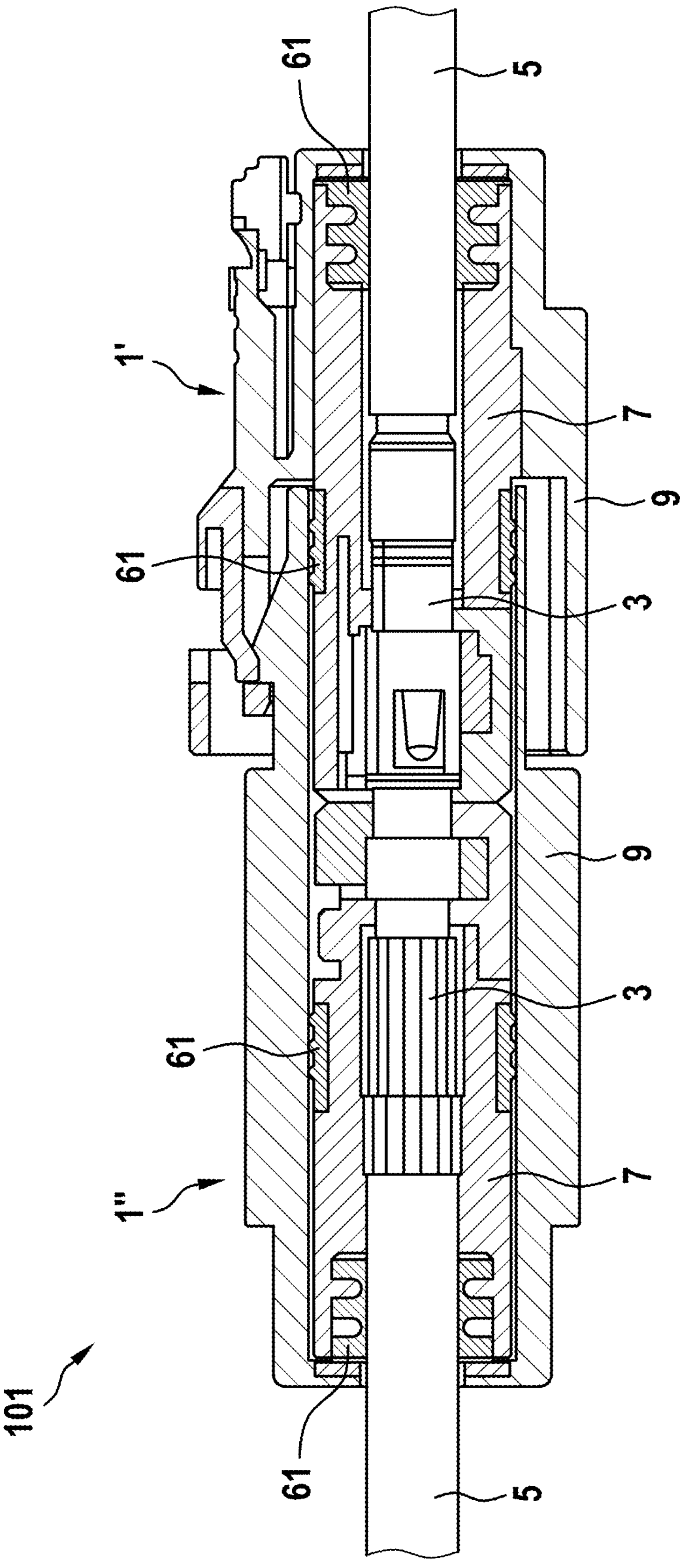
FIG. 12 shows a lengthwise cross-sectional view of the plug-in connection system.

From FIG. 12 it may be seen that the plug-in connection system 101 is sealed. Seals 61, such as lamellae of a lamellar seal, are disposed on the contact carrier 7 on the side facing the respective cable 5. These seals 61 reduce moisture penetration between the cable sheath and the inside of the contact carrier 7. A seal 61 is also disposed between the outside of the contact carrier 7 and the respective plug housing 9. Finally, a seal 61 is disposed on the outside of the contact carrier 7, which interacts with the inside of the plug housing 9 of the other cable 5 to form a seal.

Figure 13:
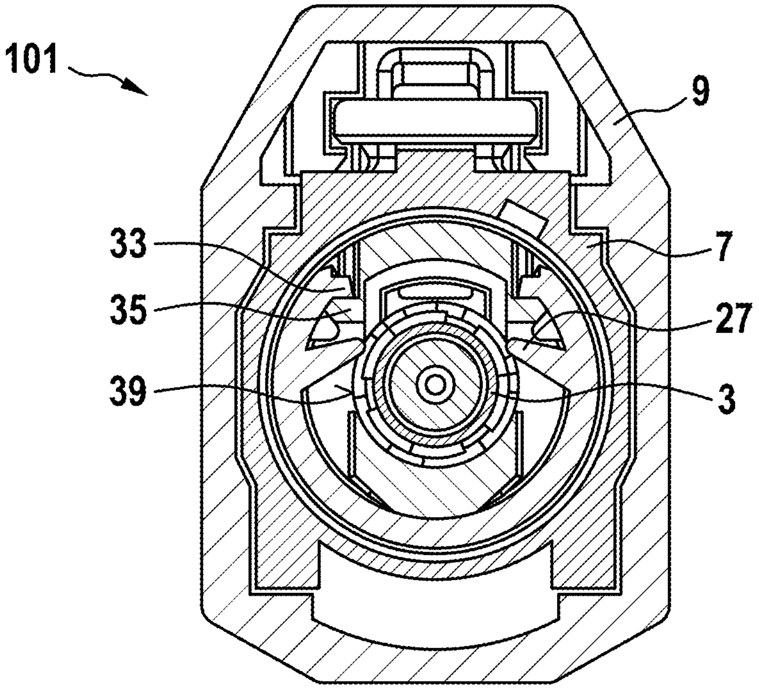
FIG. 13 shows a transverse cross-sectional view of the plug-in connection system.

FIG. 13 shows a cross-section through the plug-in connection system 101 shown in FIG. 12. The sectional plane is through the lever portion 27.

Figure 14:
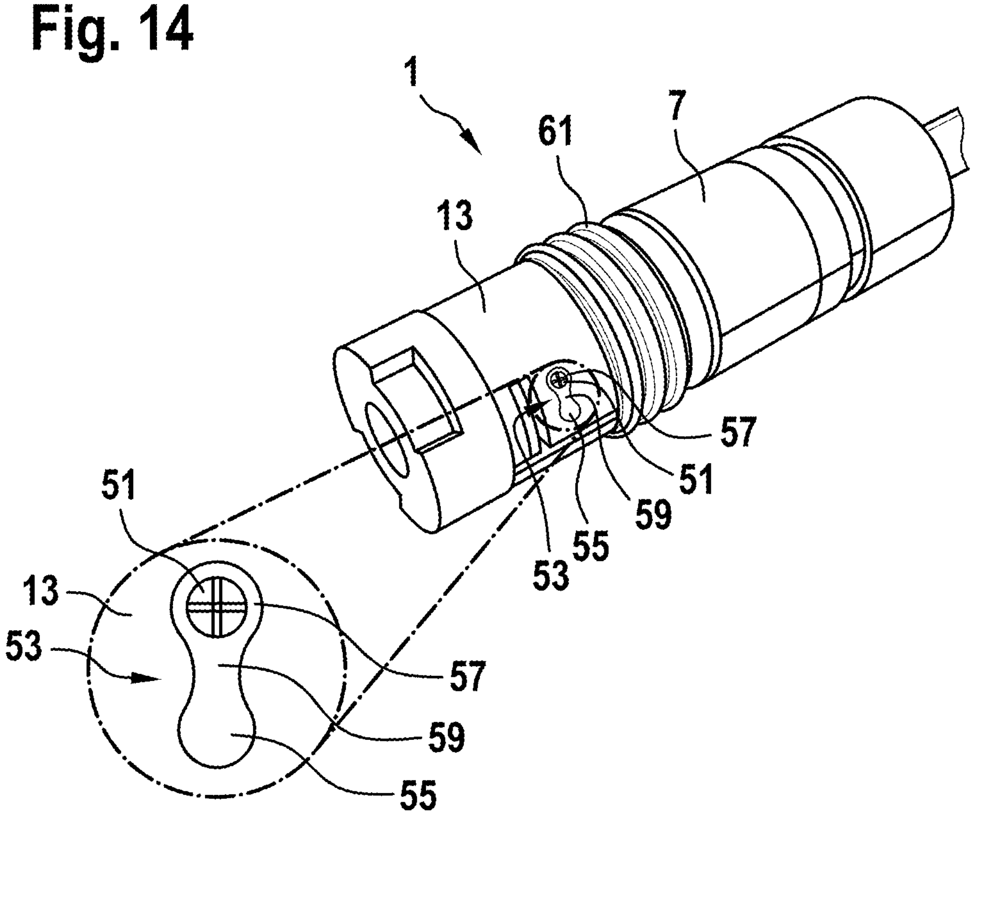
FIG. 14 shows an alternative secondary locking system.

FIG. 14 shows an alternative fixing of the SLE 13 on the contact carrier 7. A radially protruding stud 51 is provided on the outside of the contact carrier 7, which engages in a constricted recess 53 in the form of a groove or gap in the SLE 13. With the SLE 13 in the pre-locked intermediate position, the stud 51 is located in a wide first area 55 of the recess 53. In the locked end position, the stud 51 is located in a wide second area 57 of the recess 53. The two wide areas 55, 57 are separated from each other by a narrowed transition area 59, so that to move the SLE 13 from the pre-locked intermediate position to the locked end position, the stud 51 must pass through the narrowed transition area 59. The stud 51 is slightly wider than the transition area 59, and the stud and/or the constricted recess 53 may be elastically deformed, at least in the region of the transition area 59. The groove-stud combination may be provided in addition to or as an alternative to the pre-fixing described above by means of the prestressed bearing of the protruding formations 29 of the lever portions 27, in particular if the diameter of the cable 5 (and thus of the SLE 13) is so large that fixing the SLE 13 by means of latching hooks and latching elements would not generate sufficient holding force.

Finally, it pointed out that terms such as "having", "comprising" etc. do not exclude other elements or steps, and terms such as "one" or "a" do not exclude a plurality. It should further be noted that features or steps that have been described with reference to one of the above embodiments may also be used in combination with other features or steps of other embodiments described above. Reference signs in the claims are not to be considered as limitations.

LIST OF REFERENCES

1 Plug connector
3 Plug contact
5 Cable
7 Contact carrier
9 Plug housing
11 Primary locking element
13 Secondary locking element
15 Longitudinal direction
17 Radial inward direction
19 Locking portion
21 Rib
23 Circumferential surface of the plug contact
25 Cavity
27 Lever portion
29 Protruding formation
31 Arm
33 First latching hook
35 Central mating latching element
37 Outer surface of the contact carrier
39 Counterpressure surface
41 Second latching hook
43 Separation gap
45 Third latching hook
47 Leg
49 Primary locking latching hook
51 Stud
53 Constricted recess
55 Wide first area
57 Wide second area
59 Narrowed transition area
61 Seal
63 Spring basket
65 Closure surface
67 Opening
69 Support portion
71 Front mating latching element
73 Retaining slot
75 Slot edge
77 Inner circumference
79 Tooth-like projection
81 End-face opening
83 Cavity
101 Plug-in connection system
a Angle of lever portion

The invention claimed is:

1. An electrical plug connector, comprising:
a plug contact at one end of a cable,
a contact carrier,
a plug housing,
a primary locking element, and
a secondary locking element,
wherein the plug contact is accommodated in the contact carrier,
wherein the contact carrier is accommodated in the plug housing,
wherein both the primary locking element and the secondary locking element are each configured so as to fix the plug contact in the contact carrier against removal from the contact carrier by pulling in an axial direction parallel to a longitudinal direction of the cable,
wherein the secondary locking element is configured as a separate component which is displaceable relative to the contact carrier,
wherein the secondary locking element, the contact carrier and the plug contact are configured such that the secondary locking element is brought from a pre-fixed intermediate position into a fixed end position by displacement in a radially inward direction relative to the contact carrier, the secondary locking element being reversibly detachably held on the contact carrier in the pre-fixed intermediate position and the secondary locking element being firmly held on the contact carrier in the fixed end position and bearing, at least in areas, against the plug contact such that the plug contact is fixed in the contact carrier by the secondary locking element against the removal from the contact carrier by pulling in a direction parallel to a longitudinal direction of the cable.

2. The plug connector according to claim 1,
wherein the secondary locking element is configured as a one-piece molded part.

3. The plug connector according to claim 1,
wherein the secondary locking element has a locking portion in a form of a rib extending in the radially inward direction,
wherein the secondary locking element, the contact carrier and the plug contact are configured such that the locking portion of the secondary locking element in the fixed end position passes through an area of the contact carrier and bears under mechanical prestress against a circumferential surface of the plug contact.

4. The plug connector according to claim 3,
wherein the plug contact has a cavity on the circumferential surface,
wherein the secondary locking element, the contact carrier and the plug contact are configured such that the secondary locking element may only be moved from the pre-fixed intermediate position to the fixed end position when the plug contact is received in a target position in the contact carrier such that the locking portion of the secondary locking element may engage in the cavity of the plug contact.

5. The plug connector according to claim 1,
wherein the secondary locking element has two lever portions in a form of projections projecting in the radially inward direction and at an angle towards a plane of symmetry of the secondary locking element.

6. The plug connector according to claim 5,
wherein the secondary locking element has two arms,
wherein each of the lever portions is disposed centrally and projecting radially inwards on one of the arms,
wherein a first latching hook is formed at a free end of each of the arms, and
wherein a mating latching element is formed on the contact carrier associated with each of the first latching hooks.

7. The plug connector according to claim 6,
wherein the secondary locking element and the contact carrier are configured such that the first latching hooks of the secondary locking element are not latched with the associated mating latching elements in the pre-fixed intermediate position of the secondary locking element, and are latched with the associated mating latching elements in the fixed end position.

8. The plug connector according to claim 6,
wherein the secondary locking element and the contact carrier are configured such that, in the intermediate position, the secondary locking element with its lever portions bears under mechanical prestress against an outer surface of the contact carrier.

9. The plug connector according to claim 6,
wherein the secondary locking element and the contact carrier are configured such that, when the secondary locking element is displaced from the intermediate position to the end position, the two arms are spread apart from one another due to the lever portions projecting therefrom being supported on associated counter-pressure surfaces on the contact carrier, such that the first latching hooks may engage behind the mating latching elements.

10. The plug connector according to claim 6,
wherein the secondary locking element further comprises two second latching hooks,
wherein each of the second latching hooks is separated from an associated one of the arms by a separation gap and is disposed axially spaced from the lever portion projecting from the associated arm.

11. The plug connector according to claim 10,
wherein the secondary locking element also has two third latching hooks,
wherein each of the third latching hooks is disposed at an axial distance from an associated one of the second latching hooks.

12. The plug connector according to claim 1,
wherein the primary locking element has a leg,
wherein the leg extends from the contact carrier in a direction parallel to the longitudinal direction,
wherein the leg has a primary locking latching hook at its unsupported end, and
wherein the leg is elastically prestressed in a direction transverse to the longitudinal direction in the radially inward direction towards the plug contact.

13. The plug connector according to claim 1,
wherein the contact carrier has a stud projecting in a radially outward direction,
wherein the secondary locking element has a constricted recess with a wide first area, a wide second area and a narrowed transition area between the first and the second areas,
wherein the secondary locking element and the contact carrier are configured such that the stud engages in the wide first area of the constricted recess when the secondary locking element is in the pre-fixed intermediate position, and the stud passes through the narrowed transition area into the wide second area of the constricted recess when the secondary locking element is displaced from the pre-fixed intermediate position into the fixed end position.

* * * * *